United States Patent
Taylor

(10) Patent No.: US 7,139,157 B2
(45) Date of Patent: Nov. 21, 2006

(54) SYSTEM AND METHOD FOR PROTECTING A LOAD FROM A VOLTAGE SOURCE

(75) Inventor: John P. Taylor, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 197 days.

(21) Appl. No.: 10/903,984

(22) Filed: Jul. 30, 2004

(65) Prior Publication Data

US 2006/0023381 A1 Feb. 2, 2006

(51) Int. Cl.
*H02H 3/20* (2006.01)

(52) U.S. Cl. .................. 361/84; 361/91.2; 361/91.7; 361/111

(58) Field of Classification Search ............. 361/91.7, 361/91.2, 91.1, 90, 111, 82, 84
See application file for complete search history.

(56) References Cited

U.S. PATENT DOCUMENTS

| | | | | |
|---|---|---|---|---|
| 4,716,489 A | | 12/1987 | Imamura et al. ........... 361/91.2 |
| 4,763,184 A | * | 8/1988 | Krieger et al. ............. 257/362 |
| 4,814,687 A | | 3/1989 | Walker ....................... 323/275 |
| 4,890,020 A | | 12/1989 | Bird ........................... 227/113 |
| 4,893,158 A | | 1/1990 | Mihara et al. .............. 257/341 |
| 4,949,211 A | | 8/1990 | Edwards ..................... 361/18 |
| 4,955,069 A | | 9/1990 | Ionescu ...................... 388/811 |
| 5,012,381 A | | 4/1991 | Elliott et al. ................ 361/184 |
| 5,023,692 A | * | 6/1991 | Wodarczyk et al. ........ 257/370 |
| 5,111,353 A | | 5/1992 | Kotowski et al. .......... 361/91.1 |
| 5,159,515 A | | 10/1992 | Fishbein ..................... 361/18 |
| 5,325,258 A | | 6/1994 | Choi et al. .................. 361/87 |
| 5,488,533 A | | 1/1996 | Cassidy ...................... 361/93.1 |
| 5,546,264 A | * | 8/1996 | Williamson et al. ........ 361/84 |
| 5,585,991 A | * | 12/1996 | Williams .................... 361/30 |
| 5,592,353 A | | 1/1997 | Shinohara et al. |
| 5,666,254 A | | 9/1997 | Thomas et al. ............. 361/8 |
| 5,684,663 A | | 11/1997 | Mitter ........................ 361/106 |
| 5,714,869 A | | 2/1998 | Tamechika et al. ......... 320/101 |
| 5,742,463 A | | 4/1998 | Harris ........................ 361/88 |
| 6,049,447 A | | 4/2000 | Roesch et al. .............. 361/58 |
| 6,054,738 A | | 4/2000 | Sander et al. ............... 257/341 |
| 6,067,219 A | | 5/2000 | Armstrong et al. ......... 361/101 |
| 6,154,081 A | | 11/2000 | Pakkala et al. ............. 327/309 |
| 6,304,422 B1 | | 10/2001 | Sander et al. ............... 361/84 |
| 6,606,227 B1 | * | 8/2003 | Rapsinski et al. ........... 361/86 |
| 6,678,183 B1 | * | 1/2004 | Creger et al. ............... 363/146 |
| 6,707,654 B1 | | 3/2004 | Ito et al. ..................... 361/58 |
| 6,791,296 B1 | * | 9/2004 | Chu et al. ................... 320/114 |
| 6,992,467 B1 | * | 1/2006 | Fey ............................ 323/266 |

OTHER PUBLICATIONS

Paul Horowitz and Winfield Hill, The Art of Electronics. 1989. Press Syndicate of the University of Cambridge, 2nd Edition. pp. 48-51.*

* cited by examiner

*Primary Examiner*—Brian Sircus
*Assistant Examiner*—Terrence Willoughby

(57) ABSTRACT

A field effect transistor (FET) is used as the protection circuit. The gate is grounded through an electrical element. The voltage source is connected to the drain of the FET. The load is connected to the source of the FET. At low input voltages, the FET conducts in body diode mode. At higher input voltages, the FET turns "on" and conducts more efficiently.

10 Claims, 8 Drawing Sheets

Prior Art

SYSTEM AND METHOD FOR PROTECTING A LOAD FROM A VOLTAGE SOURCE

BACKGROUND OF THE INVENTION

1. Field of the Invention

The invention relates generally to electronic devices and more particularly to protection circuits for protecting loads from voltage sources.

2. Background

Many electronic devices have electric circuits, known as sensitive circuits, that require protection from certain problematic electrical conditions, such as voltage and power conditions. Common problematic conditions include high voltages (above some threshold), negative voltages and fast changing, negatively moving voltages, also referred to as fast negative transients.

Examples of devices that commonly have circuits that require protection include portable electronic equipment such as, for example, personal digital assistants, laptop computers, and wireless communication devices, including at least cell phones and pagers. Commonly, the sensitive circuits need protection from other circuits to which the sensitive circuits may be connected. For example, AC and DC power sources may present problematic electric conditions to the sensitive circuits. The power source may also be a car power adapter. Another source of problematic electrical conditions is failed AC to DC adapters. Some failed AC to DC adapters may fail such that they present an AC output at the DC side of the adapter.

The numbers and types of electronic devices and their adapters and connections to other electronic devices are growing constantly. It is sometimes troublesome for consumers to be certain that they are connecting the correct connector (e.g., power supply) into their electronic devices. For example, a consumer may have more than one cell phone and more than one charger for each cell phone. The consumer does not want the cell phone to break if the wrong charger is mistakenly plugged into one of the cell phones. Alternately, cell phone manufacturers do not want their cell phones to break if a consumer mistakenly connects the cell phone to the wrong charger. Several companies make cell phone chargers, known as after-market chargers, for other companies' cell phones. The cell phone manufacturers would like to be as certain as possible that the after-market chargers do not break their cell phones, even considering that the after-market chargers may not contain adequate protection circuits.

Some known solutions include connecting the source to the load through a diode, as shown in FIG. 12. The diode 200 is connected to a voltage source 210 and a load 220. The FIG. 12 circuit typically results in poor energy transfer (e.g., charging) efficiency. Diodes have a non-zero forward voltage $V_F$. They therefore consume energy, lower the voltage available to the load, and produce heat.

Another known solution is shown in FIG. 11. The FIG. 11 circuit also uses a diode 230, but in this case, the diode is connected between ground and the input 240 of the load 220. A fuse 250 is connected between a voltage source 210 and the load 220. A problem with the FIG. 11 circuit is that when an excess current condition occurs, the fuse becomes a permanent open circuit and the source 210 is no longer connected to the load.

Some solutions do not provide for protection from fast negative shoot-through. That is, problems occur if an input voltage drops quickly. Fast negative transients can cause negative shoot through. Negative shoot through happens when a fast negative transient results in a negative voltage appearing on the load side of a device. For example, a protection circuit may be designed to prevent negative voltages from passing across the protection circuit to a load. A negative shoot through occurs when a transient negative voltage reaches the load due to a fast changing negative input voltage.

SUMMARY OF THE INVENTION

In order to overcome the problems associated with conventional approaches for protecting sensitive electric circuits from problematic electric conditions, a field effect transistor (FET) is used as the protection circuit. The gate is grounded through an electrical element. The voltage source is connected to the drain of the FET. The load is connected to the source of the FET. At low input voltages, the FET conducts in body diode mode. At higher input voltages, the FET turns "on" and conducts more efficiently.

Advantageously, the FET conducts energy from the source to the load more efficiently than some prior solutions.

Other aspects, advantages, and novel features of the invention will become apparent from the following Detailed Description, when considered in conjunction with the accompanying drawings.

BRIEF DESCRIPTION OF THE DRAWINGS

Preferred embodiments of the present inventions taught herein are illustrated by way of example, and not by way of limitation, in the figures of the accompanying drawings, in which.

DETAILED DESCRIPTION

Figure 1:
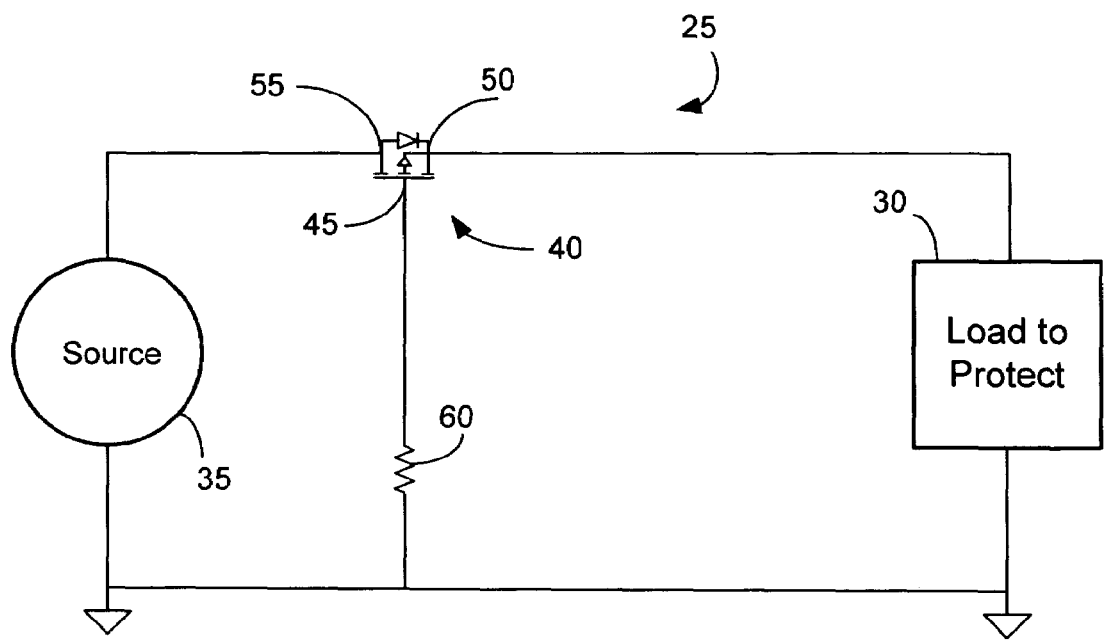
FIGS. 1–7 show block diagrams illustrating a protection circuit connected to a load and a source voltage.

FIG. 1 shows a block diagram illustrating a protection circuit 25 connected to a load 30 to be protected from a voltage source 35. The protection circuit has a field effect transistor (FET) 40 connected between the load 30 and the voltage source 35. As will be understood, the source, drain and gate each have conductors or conducting pads, for making electrical connections to other electric components.

The FET may be a metal-oxide semiconductor FET (MOSFET) as is shown in FIG. 1. As is well known in the art, a FET has a gate 45, a source 50 and a drain 55. The drain 55 of the FET 40 is connected to the voltage source 35. The source 50 is connected to the load 30. The gate 45 is connected to a an electrical element 60. As shown in FIG. 1, the electrical element 60 may be a resistor 60.

Configured as in FIG. 1, as a positive voltage is applied to the drain 55, from a zero voltage, the MOSFET will first conduct in body diode mode. In body diode mode, the gate to source voltage $V_{GS}$ of a FET is below the threshold $V_{GSTH}$ to put the FET in an "on" state, or turn the FET on. In the "on" state, the series resistance of a FET is negligible, but in body diode mode, the FET has a non-zero forward voltage, which is equivalent to having a non-negligible series resistance. In the body diode mode, the FET acts like a diode from drain to source. Thus, as the input voltage applied to the drain 55 by the voltage source 35 increases from zero, the FET will not conduct until a diode bias voltage of the FET body diode is reached. The diode bias voltage is typically about 0.5 Volts (V)

The voltage at the source 50 will follow and stay lower than the voltage at the drain 55 by about 0.5 V. As the source 50 voltage increases, a voltage develops from the gate to the source, that is, the source 50 is at a higher voltage than the gate 45, because the gate is grounded. Grounding is shown through resistor 60. However, the gate may be grounded directly, that is, without the use of resistor 60. Alternately stated, resistor 60 may have zero resistance.

When the source 50 voltage reaches $V_{GSTH}$ the FET will start to turn on. As will be described later with reference to FIG. 8, a FET turns on fairly quickly with rising $V_{GS}$, but it is not an ideal switch with an absolutely abrupt change from on to off. Once the FET is on, the FET conducts from the drain 55 to the source 50, with a very small series resistance $R_{DSON}$.

Advantageously, the voltage drop across an "on" FET is much smaller than that across a diode, known as the forward voltage $V_F$. In other words, the FET acts much more like an ideal switch than a diode, allowing positive voltages to more efficiently pass through the MOSFET and reach the load. The MOSFET consumes less power than a typical diode. This results in less heat generation and more efficient power transfer from the voltage source 35 to the load 30. Less heat generation can result in several advantages, including avoiding thermal breakdown of devices and avoiding degraded performance due to thermal performance coefficients of various components.

Figure 2:
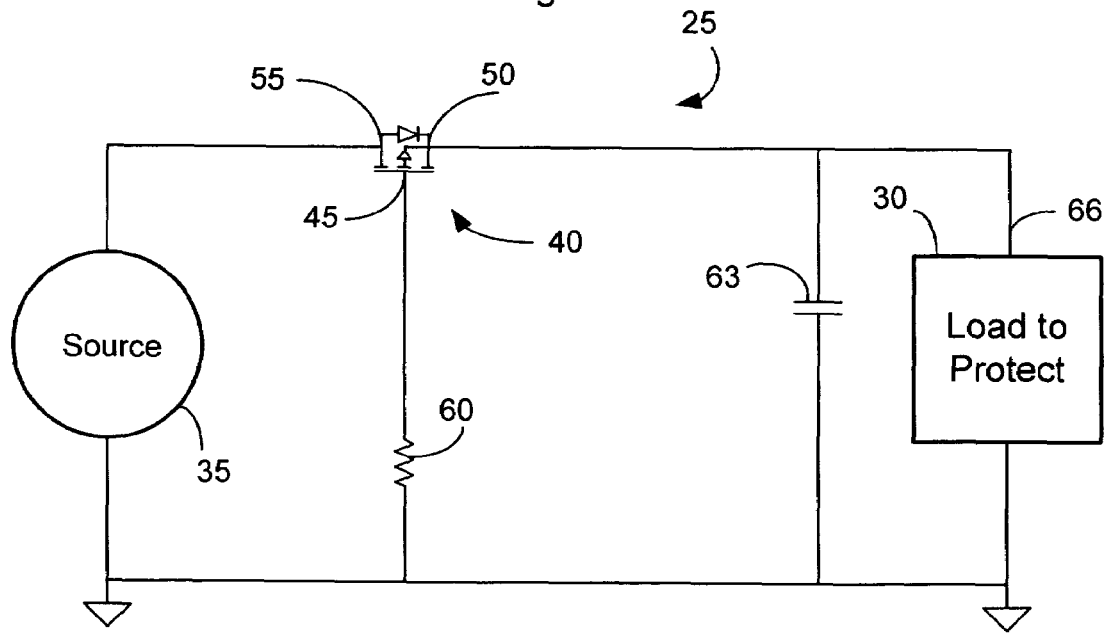

FIG. 2 shows a block diagram of a protection circuit, load and voltage source similar to those shown in FIG. 1. In addition to the FET 40 and resistor 60, the protection circuit includes a capacitor 63 connected from the load input 66 to ground. The capacitor 63 serves to store charge to supply positive voltage to protect against any negative voltage that may pass through the other portions of the protection circuit. The capacitor 63 serves, in a sense, as a last line of defense for the load 30 against fast negative transients.

Figure 3:
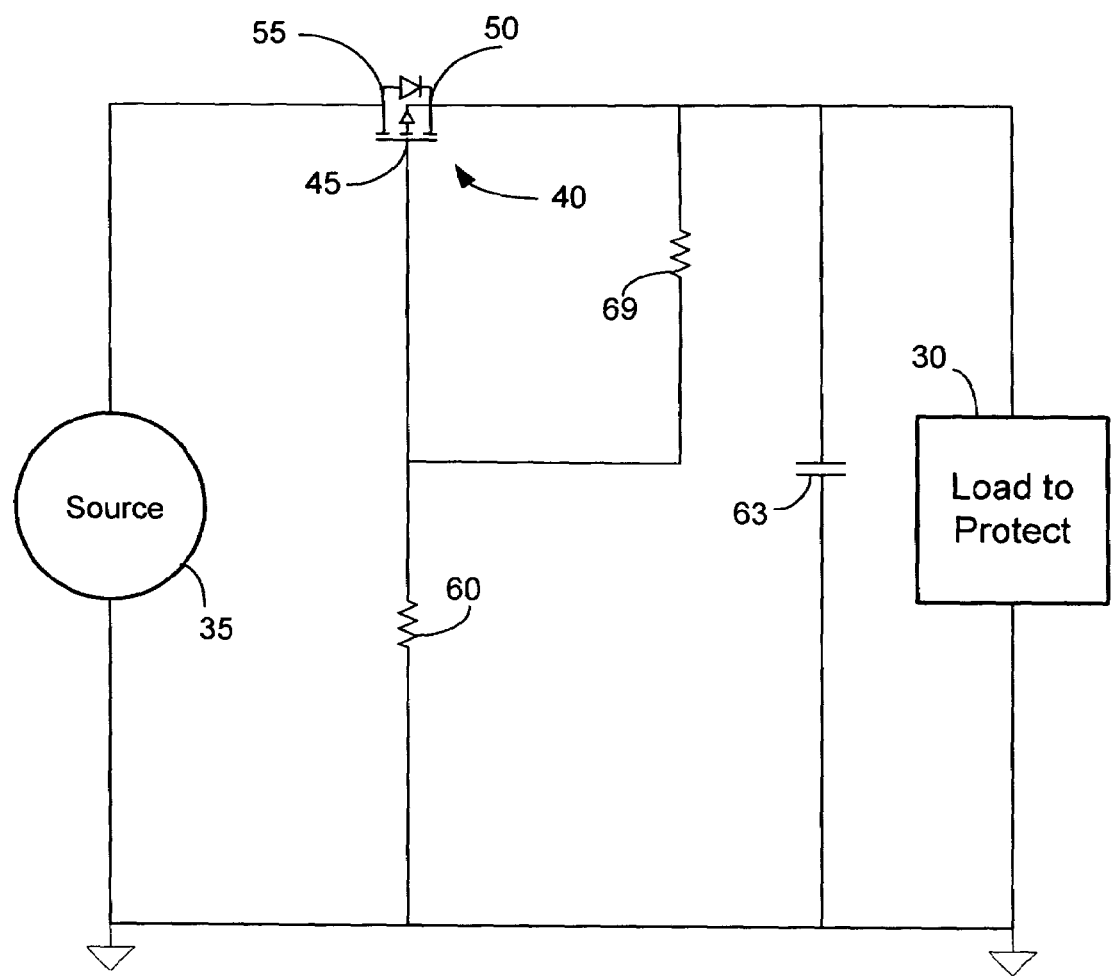

FIG. 3 shows a block diagram illustrating a protection circuit, load and source similar to those in FIG. 2. Compared to FIG. 2, an electrical element 69 has been added. The electrical element 69 may be a resistor as shown in FIG. 3. The resistor 69 overcomes a disadvantage of the circuit shown in FIG. 2.

The circuit in FIG. 2 does not limit the voltage $V_{GS}$ that can develop across the source and gate. FET's have a breakdown voltage known as the gate to source breakdown voltage, or $V_{GSBreakdown}$. A FET with a higher $V_{GSTH}$ typically has a higher $V_{GSBreakdown}$, and a FET with a lower $V_{GSTH}$ typically has a lower $V_{GSBreakdown}$. For MOSFET's, a typical $V_{GSBreakdown}$ is 12 V for a $V_{GSTH}$ of 2.5 V. Alternatively, a MOSFET with a higher $V_{GSBreakdown}$ of 20 V might have a $V_{GSTH}$ of 5 V. Alternatively a MOSFET with a lower $V_{GSBreakdown}$ of 6 V might have a $V_{GSTH}$ of 1.8 V.

A lower $V_{GSTH}$ is desirable, because a MOSFET with a lower $V_{GSTH}$ typically (1) has better performance, such as a lower $R_{DSON}$, especially for low gate to source voltages, and (2) allows for operation of the MOSFET at lower source 35 voltages. Lower $R_{DSON}$, in turn, results in better power transfer from the voltage source 35 to the load 30. However, a higher $V_{GSBreakdown}$ is also desirable, because voltages above $V_{GSBreakdown}$ applied across the source 50 and gate 45 result in destruction of the MOSFET. The destruction (failure) mode of a MOSFET is to become an electrical short. Thus, in failure, the MOSFET conducts all the power that destroyed the MOSFET 40 toward the load 30. This can be catastrophic for the load, especially when and if the power source becomes negative. Therefore, it is important to ensure that $V_{GS}$ never exceeds $V_{GSBREAKDOWN}$.

Resistor 69 has been added in FIG. 3 to reduce the likelihood that $V_{GS}$ will exceed $V_{GSBREAKDOWN}$. Resistor 69 causes the gate 45 voltage to follow the source 50 voltage. Specifically, a positive voltage at the source 50 brings the voltage at the gate 45 up as well. The voltage at the gate $V_G$ is a fraction of the voltage at the source $V_S$, according to the well known voltage divider function, $V_G=V_S*R1/(R1+R2)$, where R1 is the resistance of the first resistor 60 and R2 is the resistance of the second resistor 69. Since $V_G$ follows $V_S$ up when $V_S$ goes up, $V_{GS}$ stays smaller. This helps prevent $V_{GS}$ from exceeding $V_{GSBREAKDOWN}$. However, at some higher input voltage from the voltage source 35, resulting in a higher source 50 voltage, $V_{GSBREAKDOWN}$ can still be exceeded. Furthermore, the circuit of FIG. 3 has the disadvantage that power is consumed by resistor 69 and resistor 60. The power consumption has the disadvantages of power consumption described above.

Figure 8:
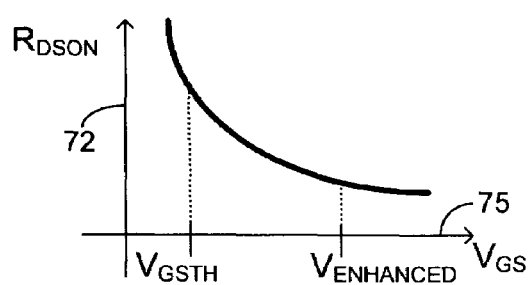
FIG. 8 shows a graph illustrating a relationship between a gate voltage and a drain to source resistance when a FET is "on".

Further, the circuit of FIG. 3 has the disadvantage that $V_{GS}$ varies nearly proportionally to the input voltage supplied by the voltage source 35. As such, at low source 35 voltages, the MOSFET 40 may often operate in a state that is not fully enhanced. Referring to FIG. 8, a typical MOSFET operating conditions are graphed. The vertical axis 72 shows $R_{DSON}$, while the horizontal axis 75 shows $V_{GS}$. As $V_{GS}$ increases from zero V, $R_{DSON}$ goes from a very high resistance to a very low resistance. At a value $V_{GSTH}$, the MOSFET is considered on, but the MOSFET is not in its more desirable mode of operation until $V_{GS}$ exceeds $V_{ENHANCED}$. $R_{DSon}$ is very low when $V_{GS}$ exceeds $V_{ENHANCED}$. This results in efficient power transfer from the voltage source 35 to the load 30. Referring again to FIG. 3, the voltage divider of resistors 60 and 69 cause $V_{GS}$ to change responsive to the input voltage, and possibly go below $V_{ENHANCED}$, causing inefficient power transfer.

Figure 4:
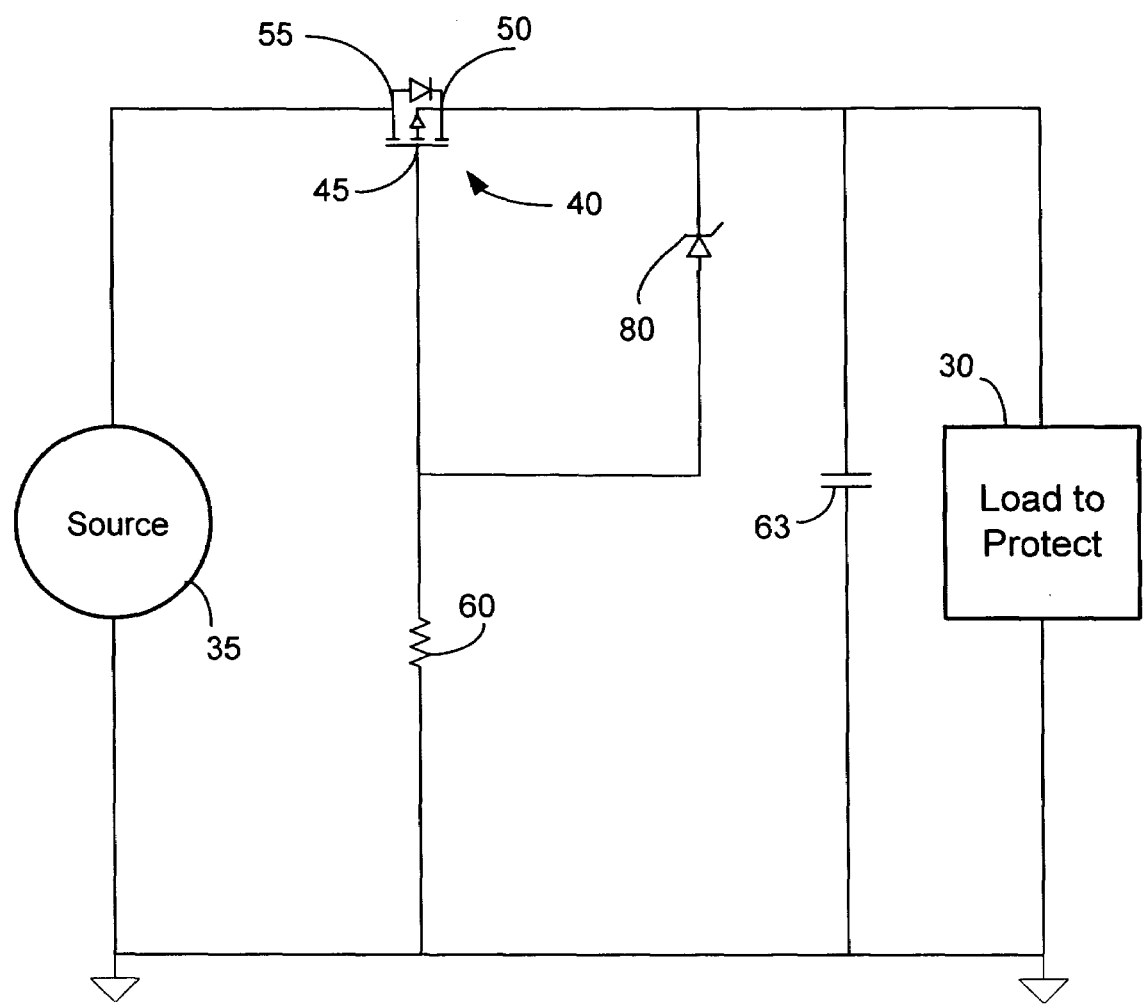

The FIG. 4 circuit has several advantages over the FIG. 3 circuit. In FIG. 4, the resistor 69 has been replaced with a different electrical element 80. The electrical element 80 is a zener diode 80. For purposes of this specification and the appended claims, an electrical element is any element that can conduct electricity. The following is a non-exhaustive list of examples of electrical elements: resistors, capacitors, inductors, diodes, zener diodes, transistors, integrated circuit portions such as CMOS connecting lines and vias and integrated capacitors, inductors and resistors, and any combination of components including one or more electrical elements.

The zener diode 80 primarily operates to keep $V_{GS}$ nearly constant as long as the input voltage $V_{IN}$ supplied by the voltage source 35 is above $V_Z+V_{RDSON}$, where $V_Z$ is the zener diode turn on voltage and $V_{RDSON}$ is the very small voltage drop from the drain to the source of the MOSFET when the MOSFET is on. As is well known in the art, zener diodes have a nearly constant voltage once they are on. Thus, once the zener diode 80 is on, it holds $V_{GS}$ to a nearly constant value. With careful selection of the zener diode turn on voltage to correspond to a voltage above $V_{ENHANCED}$, but below $V_{GSBREAKDOWN}$, it can be ensured that $V_{GSBREAKDOWN}$ is not exceeded, and that the electrical element 80 does not limit gate to source voltage of the MOSFET while $V_S$ is below $V_Z$.

Using a zener diode 80 especially improves the performance of the MOSFET, improving power transfer efficiency, when $V_{IN}$ is less than $V_Z + V_{RDSON}$, because then the zener diode 80 is practically like an open circuit. That increases $V_{GS}$ over the FIG. 3 circuit, for low input (source 35) voltages.

But the FIG. 4 circuit does have some drawbacks. First, zener diodes are relatively expensive compared to some transistors and other diodes. Second, a zener diode with a lower zener voltage is generally preferred for use with a MOSFET 40 with a lower $V_{ENHANCED}$ and therefore a lower $V_{RDSON}$. However, zener diodes with low zener voltages, and therefore compatible with low $V_{GSTH}$ MOSFET's typically have poor temperature coefficients, higher leakage current and less sharp knees, compared to zener diodes with higher zener voltages. A poor temperature coefficient means that the performance characteristics change more with temperature. More leakage means that in the off state, that is, at voltages below the zener voltage, more current still leaks through the zener diode. This would raise the gate voltage, which would decrease $V_{GS}$, which would increase $R_{DSON}$, which would result in decreased power transfer efficiency. Having a less sharp knee means that a lower zener voltage zener diode turns on more gradually as the voltage across the zener diode increases.

Figure 5:
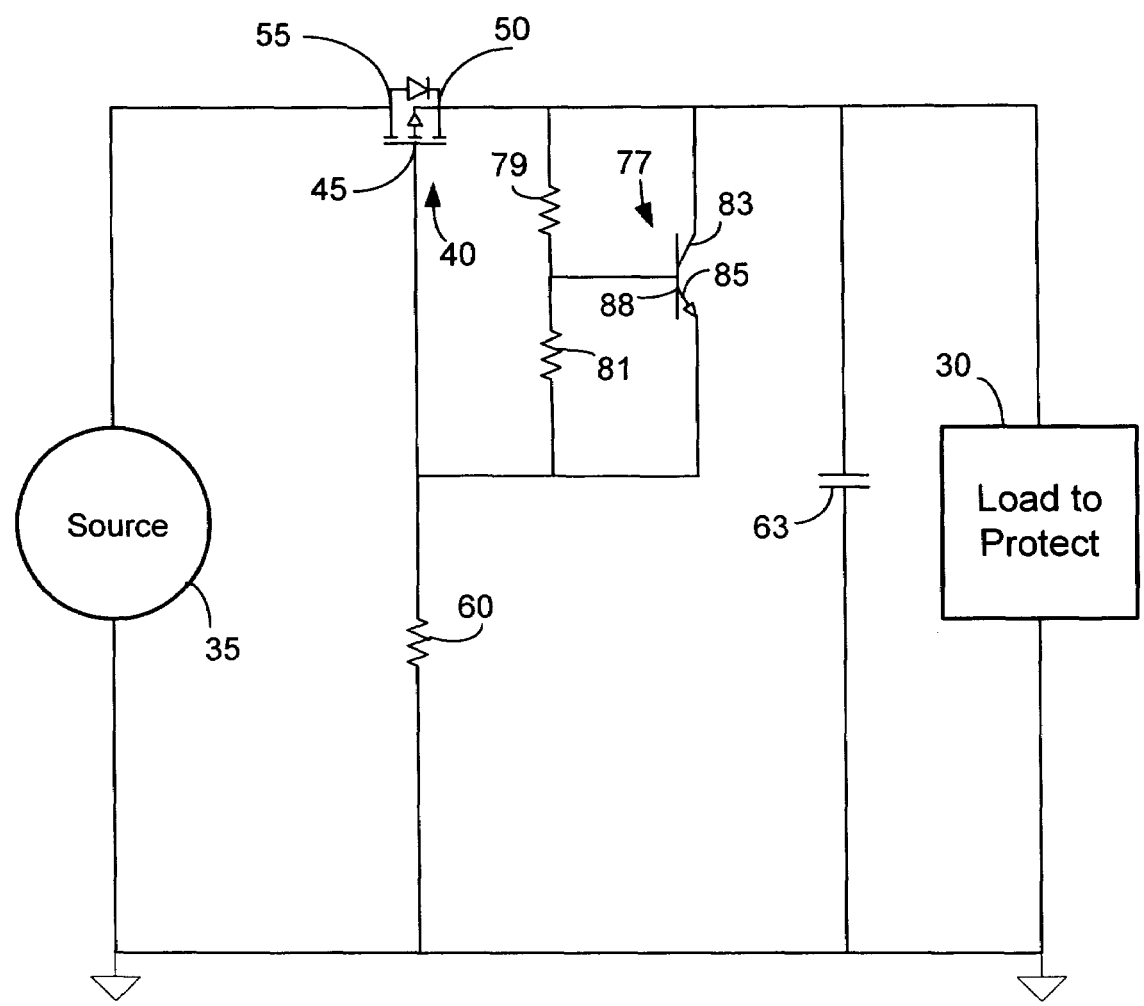

The FIG. 5 circuit has several advantages over the FIG. 4 circuit. In FIG. 5, the zener diode has been replaced with a transistor 77 and two resistors 79 and 81. The transistor 77 has a collector 83, an emitter 85 and a base 88. The collector 83 is connected to source 50. The emitter is connected to the resistors 60 and 81. The base 88 is connected to the resistors 79 and 81. The resistor 79 is connected between the source 50 and the base 88. The resistor 81 is connected between the base 88 and the emitter 85.

Thus, the transistor 77 is configured as a programmable zener from collector to emitter. In other words, $V_{CE}$ acts as the zener voltage. $V_{CE}$ is controlled, or selected, by selecting the resistors 79 and 81 which act as a voltage divider to control $V_{CE}$ and $V_{BE}$.

Advantageously, the transistor is cheaper than a typical zener diode, and offers better performance in terms of leakage current, temperature coefficient and operating current.

Even with all the protection provided as discussed with reference to FIGS. 1–5, there may still be a problem with a negative voltage passing through the protection circuit from the voltage source 35 under certain conditions. Specifically, negative shoot through may be a problem. Negative shoot through is the result of fast changes from some voltage to a more negative voltage. This causes the parasitic capacitances of the MOSFET to send transient negative voltages through the protection circuit to the load to be protected 30. The protection circuit protects from slowly changing voltages, but fast transients created by fast negative changes may get through and damage the load 30. As will be understood by those of skill in the art, fast transients can be in part due to parasitic capacitance between the MOSFET gate and source, between the MOSFET source and drain, and between the MOSFET drain and gate.

Figure 6:
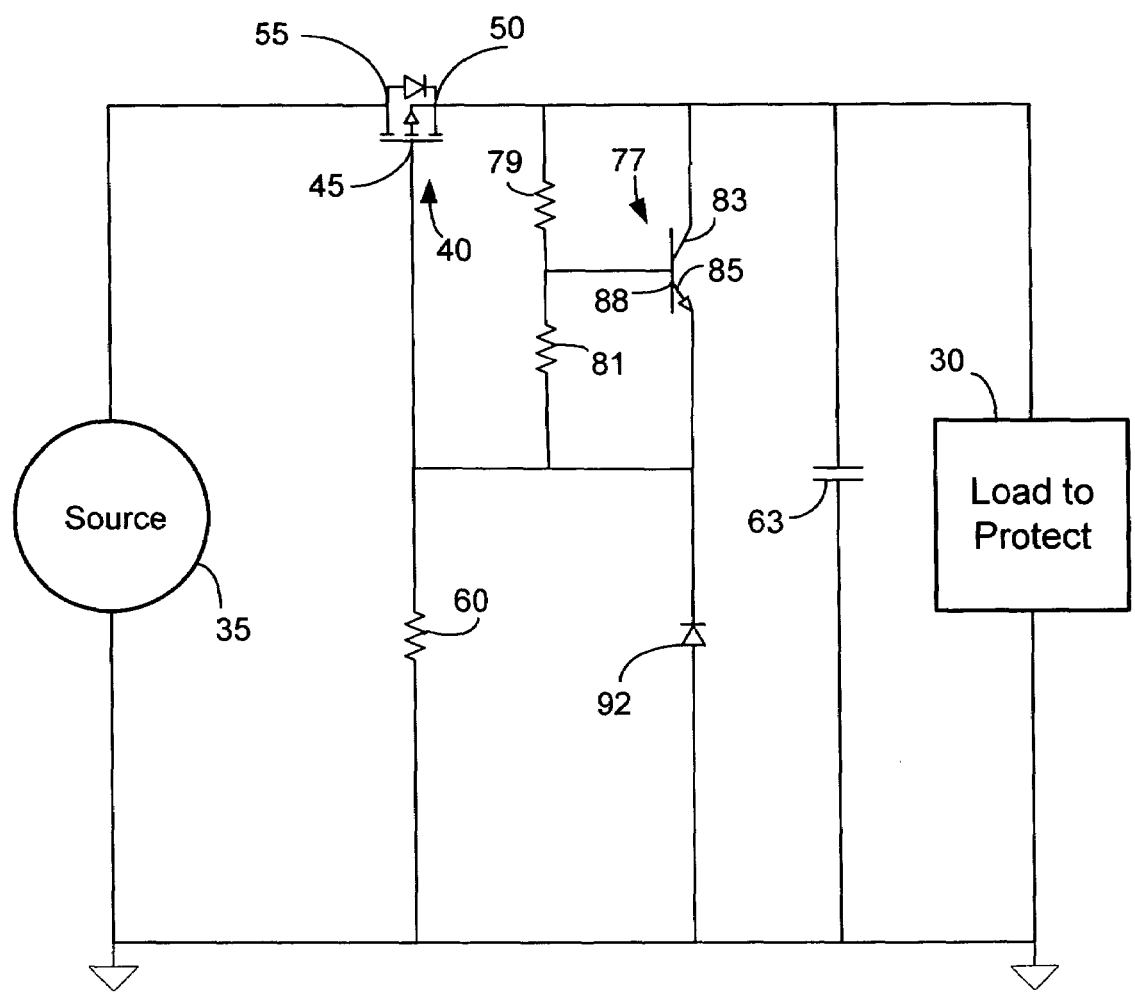

The FIG. 6 circuit has some advantages over the FIG. 5 circuit. In the FIG. 6 circuit, a diode 92 has been added, connected between ground and the gate 45 of the FET 40, with the forward bias direction of the diode 92 being from ground to the gate 40. The diode provides protection against negative shoot through. Specifically, the diode limits the gate voltage $V_G$ to be no lower than one forward bias voltage of the diode 92 below zero, or ground. That is, $V_G$ is always greater than or equal to $-V_F$, where $V_F$ is the forward bias voltage of the diode 92. Since the gate voltage can go no lower than $-V_F$, that means the source 50 can go no lower than $V_{GSTH} - V_F$, while the FET is in the "on" state. Through careful selection of $V_{GSTH}$ and $V_F$, it can be assured that $V_{GSTH}$ is greater than $V_F$, so that $V_S$ is never below zero, or ground. Since the voltage at the load 30 is essentially equal to $V_S$, the voltage at the load 30 is never below zero, or ground.

Figure 9:
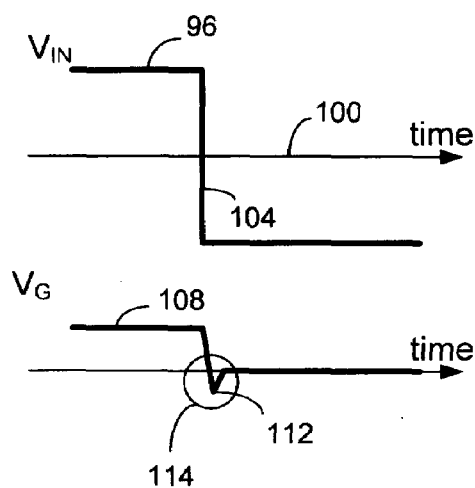
FIG. 9 shows a graph illustrating a relationship between an input voltage and a gate voltage over time.

The operation of the diode 92 within the protection circuit will now be described with respect to FIGS. 9 and 10. Referring to FIG. 9, a fast negative changing input voltage $V_{IN}$ is shown as input voltage line 96. $V_{IN}$ is an example input voltage provided by voltage source 35. $V_{IN}$ is plotted against the horizontal axis 100 of time. $V_{IN}$ has a fast negative changing portion 104. The negative changing portion 104 is shown as a vertical line. It will be understood that vertical portion 104 is an ideal representation of a fast negative changing voltage, whereas real physical quantities are not ideal. The ideal fast negative changing portion 104 is shown to make the point that the negative change occurs fast enough to cause a problem for the protection circuit without the diode 92.

$V_G$ is also plotted against time in FIG. 9. Even though the FET 40 turns off as $V_{IN}$ drops below zero V, the parasitic capacitance of the FET allows $V_G$ to briefly drop below zero as shown by dip 112. If not accounted for and corrected in the protection circuit, the dip 112 below zero volts can cause a transient negative voltage to appear at the load 30, possibly causing damage. An expanded view of a portion of FIG. 9 designated by circle 114 is shown in FIG. 10.

Figure 10:
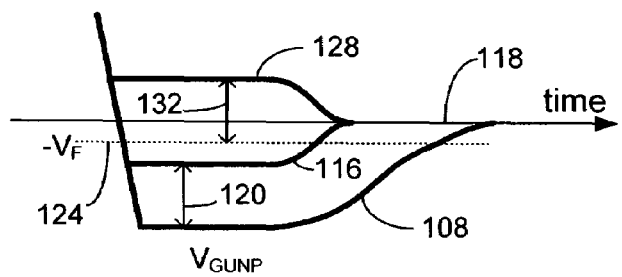
FIG. 10 shows a graph illustrating an expanded portion of the gate voltage of FIG. 9, with additional voltages superimposed.
Figure 11:
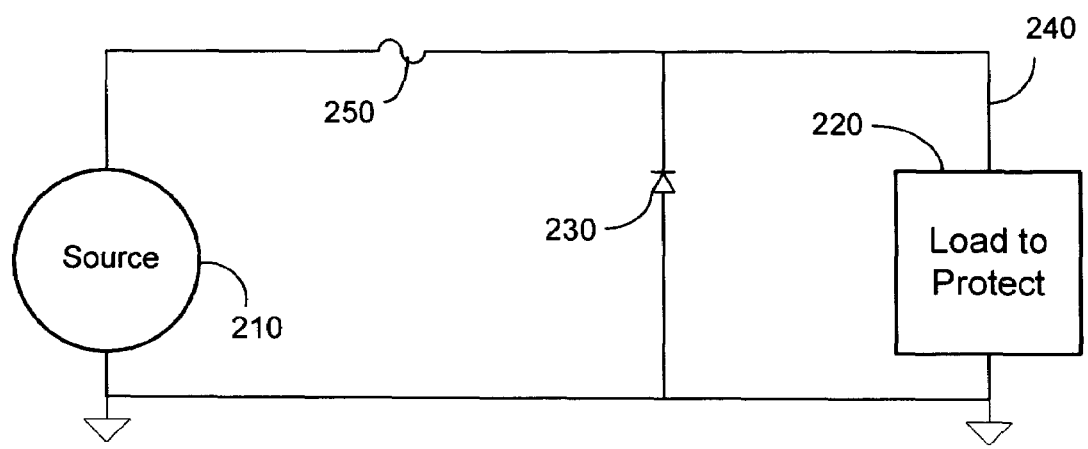
FIGS. 11–12 show block diagrams of prior art protection circuits.
Figure 12:
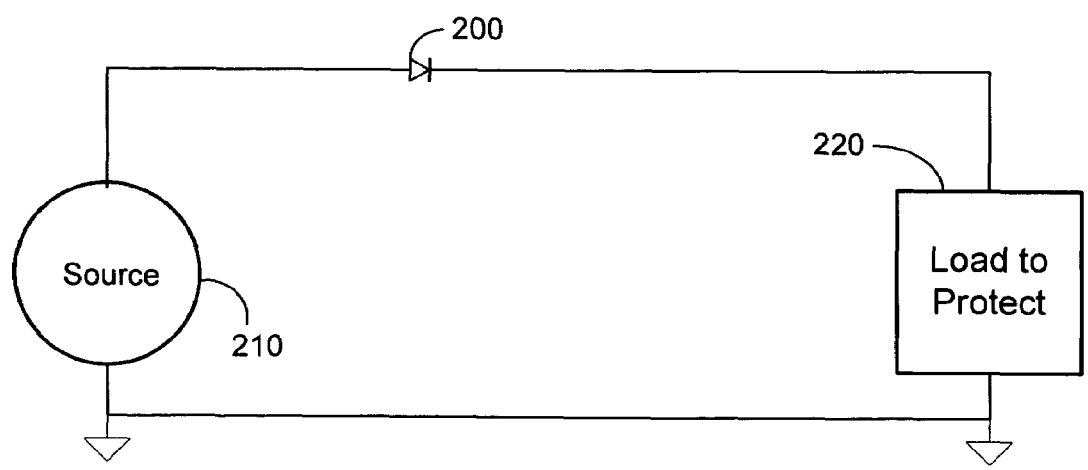

FIG. 10 shows the voltage response of the protection circuit with a fixed forward voltage device, such as diode 92, protection diode 92 is superimposed on voltage response of the protection circuit without a fixed forward voltage device, such as diode 92, both in negative shoot through conditions. FIG. 10 is a graph of voltage on the vertical axis (not shown) against time on the horizontal axis 118. Several different voltages are shown in FIG. 10. A $V_{GUNP}$ is shown as line 108, where $V_{GUNP}$ refers to $V_G$ unprotected, that is, the gate 45 voltage as a result of negative shoot through without a fixed forward voltage device, such as diode 92, protecting against negative shoot through. In other words, $V_{GUNP}$ 108 represents the gate 45 voltage that could occur without protection diode 92.

A $V_{SUNP}$ line 116 shows the source 50 voltage that may occur without protection diode 92. $V_{SUNP}$ 116 is at least $V_{GSTH}$ above $V_{GUNP}$, because the minimum difference in voltage between the gate 45 and the source 50 is $V_{GSTH}$, as is shown by arrow 120. Since voltage line 116 shows the voltage at the source 50, it is representative of the negative voltage that could damage load 30 in cases of negative shoot through.

The addition of protection diode 92 changes the various voltages present at various points in the circuit during negative shoot through conditions. As described above, the diode 92 is connected to ground, which keeps one end of the diode at zero V, or ground. When negative shoot through conditions occur, the cathode of the diode can go no lower than $-V_F$, because the diode 92 has a constant forward voltage (or zero forward voltage). $V_G$ is limited by the diode 92 to no less than $-V_F$, as shown by dashed line 124. $V_S$ is at least $V_{GSTH}$ above $V_G$, as shown by arrow 132. Thus, advantageously, VS can be restricted to positive voltages, even in cases of negative shoot through, as long as $V_{GSTH}$ is greater than $V_F$. The load 30 is protected even in cases of negative shoot through.

With a diode 92 connected between ground and the gate of the FET 40, the negative shoot through protection will be limited only by the resistance connected to the gate 45, the parasitic capacitances present, the capacitance of the capacitor 63 and the negative recovery time of the diode. In some cases, it may be advantageous to use a majority carrier diode, such as a Schottky diode for diode 92. Schottky diodes have a negligible reverse recovery time, because they are majority carrier diodes. As such, a Schottky diode will protect against negative shoot through even better than a normal diode.

Figure 7:
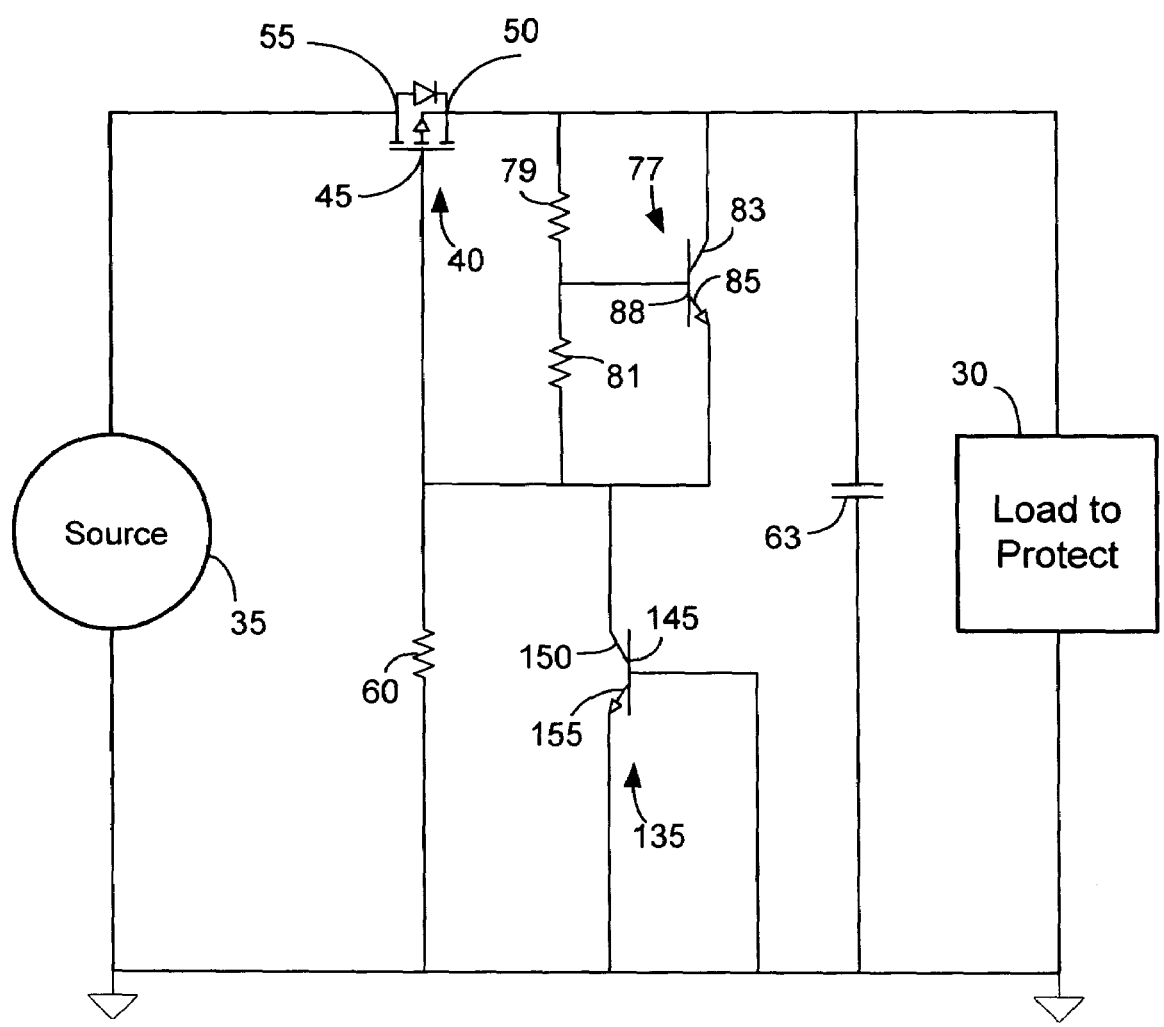

The FIG. 7 circuit has some advantages over the FIG. 6 circuit. As shown in FIG. 7, a transistor 135 replaces the diode 92. As is well known in the art, the transistor has a base 145, a collector 150 and an emitter 155. The base 145 is connected to ground. The collector is connected to the gate 45 of the FET 40. The emitter 155 is connected to ground. In this way, the transistor 135 is configured as a diode, from collector to base. This is not the common way to configure an npn bipolar junction (BPJ)transistor as a diode though. Traditionally, or commonly, an npn BPJ transistor is configured as a diode from base to emitter, as is well known in the art. Configuring the transistor as a diode from collector to base typically produces the advantage that the resulting diode has a higher reverse bias limit than a diode resulting from a transistor configured as a diode from base to emitter.

Advantageously, the third transistor 135 can be part of a single integrated circuit package with the second transistor 77. Commercially, transistors are commonly available in two-transistor packages. Thus, replacing diode 92 with transistor 135 may reduce the cost of the protection circuit.

In one configuration, resistor 79 may have a resistance of 56K ohms. Resistor 81 may have a resistance of 10K ohms. Resistor 60 may have a resistance of 2K ohms. Capacitor 63 may have a capacitance of 2.2 microfarads. However, it will become clear to one of skill in the art that many values of the above-mentioned components are possible. Further, a single design can work for a broad range of component values. For example, resistor 79 may have a resistance of 65K ohms and still contribute to effective operation of the protection circuit. As another example, resistor 60 may have a resistance of 10K ohms and still contribute to effective operation of the protection circuit. Further, FET 40 may be a commercially available FDC6036 MOSFET. Transistors 77 and 135 may be situated together in a Rohm EMX2 or UMX2N transistor package.

Various combinations of the circuits shown in FIGS. 1–7 are possible. For example, FIGS. 4 and 6 could be combined to produce a protection circuit having a zener diode 80 connected between the gate 45 and the drain 50 of the FET 40, while having a diode 92 connected between the zener diode 80 and ground. Such a protection circuit would have the advantages of the FIG. 4 circuit and some of the advantages of the FIG. 6 circuit, but not all of the advantages of the FIG. 6 circuit.

Commonly the load and the voltage source are contained in two different devices. The protection circuits described above may be integrated in the device containing the load, the device containing the voltage source, a single device containing both the load and the source, or a separate protection device altogether. Additionally, some of the protection circuit may be in one device while another part of the protection circuit may be in another device, so long as the components can be connected as described when the devices are connected together. For example, the capacitor 63 may be contained in the electronic device containing the load 30, while the FET 40 is contained in the electronic device containing the remainder of the protection circuit.

It will be understood that while the protection circuit has been described with a p-channel FET 40, FET 40 could be replaced with an n-channel FET (not shown), reversing the polarity of the protection circuit. Such a protection circuit could be used in conjunction with a source and load having a positive ground. In that case, the source and load voltages would be negative in normal operation and the protection circuit would protect against at least one of the following: positive voltages, high absolute valued negative voltages, and fast changing positive moving voltages. The drain of the n-channel FET would be connected to the voltage source 35. The source of the n-channel FET would be connected to the load 30.

An advantage of using an n-channel FET is that the performance of n-channel FET's is generally better than that of p-channel FET's, because n-channel FET technology is more mature than that of p-channel FET technology. An advantage of using a p-channel FET is that a p-channel FET works in a protection circuit with a negative ground. This is particularly useful in devices having other circuits with a negative ground. For example, in a wireless communication device, RF circuits typically use a negative ground. Thus, it is advantageous if the DC circuits, such as power supplies and charging circuits, use a negative ground.

The other circuit elements shown in FIGS. 1–7, would be configured the same as in FIGS. 1–7, except that the polarities of the active elements (diodes, zener diodes and transistors), if present, would be reversed. For example, if an n-channel FET were used, a zener diode, in a similar configuration to that shown in FIG. 4, would be connected between the n-channel FET source and the n-channel FET gate.

Further, while embodiments and implementations of the invention have been shown and described, it should be apparent that many more embodiments and implementations are within the scope of the invention. Accordingly, the invention is not to be restricted, except in light of the claims and their equivalents.

What is claimed is:

1. A protection circuit for protecting a load from a voltage source, the protection circuit comprising:
    a field effect transistor (FET) having a drain, a source and a gate
    a load output conductor connectable to the source;
    a voltage source input conductor connectable to the drain;
    a first electrical element connected to the gate and to an electrical ground;
    a second transistor having a first collector, a first base, and a first emitter where the first collector is connected to the FET's source and the first emitter is connected to the FET's gate.

2. The protection circuit of claim 1, further comprising:
    a resistor connected between the gate of the FET and the first base; and
    a second resistor connected between the first base and the first collector.

3. The protection circuit of claim 1, further comprising a second electrical element connected between the gate and the electrical ground.

4. The protection circuit of claim 3, wherein the second electrical element comprises a third transistor, the third transistor having a second collector, second base, and second emitter.

5. The protection circuit of claim 4, further comprising an electrical conductor electrically connecting the second emitter and the second base, and where the second collector is connected to the first emitter.

6. A method of protecting a circuit from a voltage source, the method comprising:
- providing a field effect transistor (FET), FET having a drain, a source and a gate;
- providing a connection between the drain of the FET to a conductor for coupling to the voltage source;
- providing a connection between the source of the FET to a conductor for coupling to the circuit;
- providing a connection between the gate to a first electrical element;
- providing a connection between the first electrical element to an electrical ground; and
- providing a second transistor having a first collector, a first base, and a first emitter where the first collector is connected to the FET's source and the first emitter is connected to the FET's gate.

7. The method of claim 6, further comprising:
- having a connection between the gate of the FET and the first base through a first resistor; and
- having a connection between the first base and the first collector through a second resistor.

8. The method of claim 6 further comprising
- providing a second electrical element between the gate and the electrical ground.

9. The method of claim 8, wherein the second electrical element comprises a third transistor, the third transistor having a second collector, second base, and second emitter.

10. The method of claim 9, further comprising providing a connection between the second emitter and the second base and a connection between the second collector is connected to the first emitter.

* * * * *